US005553893A

United States Patent [19]
Foti

[11] Patent Number: 5,553,893
[45] Date of Patent: Sep. 10, 1996

[54] CONNECTOR FOR GAS APPLIANCES

[75] Inventor: Sam J. Foti, Lyndhurst, Ohio

[73] Assignee: Hose Master, Inc., Cleveland, Ohio

[21] Appl. No.: 212,128

[22] Filed: Mar. 14, 1994

Related U.S. Application Data

[63] Continuation-in-part of Ser. No. 161,971, Dec. 6, 1993, Pat. No. 5,478,121.

[51] Int. Cl.⁶ .................................................. F16L 27/02
[52] U.S. Cl. ........................ 285/168; 285/119; 285/181; 285/286; 285/903; 285/272; 137/613
[58] Field of Search .................................. 285/168, 164, 285/163, 181, 119, 272, 273, 286, 903, 321, 149, 276; 137/613

[56] References Cited

U.S. PATENT DOCUMENTS

| | | |
|---|---|---|
| 1,393,987 | 10/1921 | Wampler . |
| 1,928,279 | 9/1933 | Bard . |
| 2,026,167 | 12/1935 | Guarnaschelli . |
| 2,240,413 | 4/1941 | Parker ..................... 285/149 |
| 2,396,123 | 3/1946 | Phillips . |
| 2,412,394 | 12/1946 | Giles . |
| 2,489,441 | 11/1949 | Warren ..................... 285/179 |
| 2,501,638 | 3/1950 | Warren ..................... 285/179 |
| 2,501,639 | 3/1950 | Warren . |
| 2,512,883 | 6/1950 | Warren ..................... 285/179 |
| 2,587,938 | 3/1952 | Warren . |
| 2,712,456 | 7/1955 | McCreery . |
| 2,722,437 | 11/1955 | Phillips ..................... 285/286 X |
| 2,730,385 | 1/1956 | Kuehne, Jr. ............... 285/179 |
| 2,731,933 | 1/1956 | Phillips ..................... 285/179 |
| 2,745,682 | 5/1956 | Chevallier . |
| 2,813,729 | 11/1957 | Jackson . |
| 2,948,306 | 8/1960 | Kuraeff . |
| 3,112,113 | 11/1963 | Taylor . |
| 3,141,473 | 7/1964 | Mejyr . |
| 3,148,922 | 9/1964 | Roessler, Jr. . |
| 3,200,807 | 8/1965 | Culligan . |
| 3,204,332 | 9/1965 | Blaisdell ..................... 285/149 X |
| 3,264,006 | 8/1966 | Downs . |
| 3,336,057 | 8/1967 | Bloomquist . |
| 3,347,570 | 10/1967 | Roessler ..................... 285/276 |
| 3,408,095 | 10/1968 | Moore . |
| 3,420,555 | 1/1969 | Faccou . |
| 3,558,163 | 1/1971 | Moore et al. . |
| 3,620,268 | 11/1971 | Paddington et al. . |
| 3,752,506 | 8/1973 | Fouts ..................... 285/179 X |
| 3,858,601 | 1/1975 | Ensigner . |
| 3,900,221 | 8/1975 | Fouts . |
| 4,111,465 | 9/1978 | Knight . |
| 4,113,288 | 9/1978 | Cox ..................... 285/276 |
| 4,369,992 | 1/1983 | Fournier et al. ............ 285/903 X |
| 4,412,693 | 11/1983 | Campanini ................ 285/272 X |
| 4,615,547 | 10/1986 | Sutcliffe et al. . |
| 4,676,267 | 6/1987 | Bloch . |
| 4,693,500 | 9/1987 | Anderson . |
| 4,786,757 | 11/1988 | Ouensby et al. ............ 285/149 X |
| 4,863,202 | 9/1989 | Oldford ..................... 285/353 X |
| 5,178,422 | 1/1993 | Sekerchak . |
| 5,215,335 | 6/1993 | Hamm, Jr. ................. 285/179 |
| 5,297,586 | 3/1994 | McIntosh ................... 285/286 |

FOREIGN PATENT DOCUMENTS

| | | |
|---|---|---|
| 0746015 | 5/1933 | France . |
| 0963720 | 7/1950 | France . |
| 0589273 | 11/1933 | Germany . |
| 1065480 | 4/1967 | United Kingdom .................. 285/149 |

Primary Examiner—Terry Lee Melius
Assistant Examiner—Heather Chun Shackelford
Attorney, Agent, or Firm—Watts, Hoffmann, Fisher & Heinke Co., L.P.A.

[57] ABSTRACT

A connector for delivering combustion gas to a gas fired appliance from a stationary supply line where the appliance moves toward and away from the supply line with the connector straightening and flexing between them as the appliance moves. The connector comprises a flexible hose assembly and first and second swivel fittings at respective hose assembly ends. Each swivel fitting defines a gas flow path and comprises a swivel member for communicating the connector with the appliance or the supply line. The hose assembly comprises a flexible metal hose member antitorsion fittings forming ends of the hose assembly connected to respective swivel fittings. The antitorsion fittings comprise pintle and nipple members rotatable relative to each other to prevent torsional stress in the hose member when the appliance moves relative to the supply line.

8 Claims, 7 Drawing Sheets

CONNECTOR FOR GAS APPLIANCES

CROSS REFERENCE TO RELATED APPLICATION

The present application is a continuation-in-part of application Ser. No. 08/161,971 filed Dec. 6, 1993, now U.S. Pat. No. 5,478,121, entitled "Connector for Gas Appliances."

FIELD OF THE INVENTION

The present invention relates to connectors for delivering gas to commercial gas fired appliances and more particularly to flexible connectors which enable moving the appliances for cleaning and maintenance without disconnecting the gas supply.

BACKGROUND OF THE INVENTION

Commercial gas fired appliances, such as fryers, ranges and stoves, used in restaurants and other commercial and institutional kitchens, must be moved frequently to permit cleaning beneath and behind them as well as for enabling maintenance, repairs and inspections. Such appliances can weigh several hundred pounds and are equipped with casters to facilitate movement.

Connectors for delivering gas to commercial gas fired appliances have been constructed to permit movement without disconnecting the gas supply lines. One proposal was to construct the connector from lengths of rigid pipe connected together by relatively rotatable sealed swivel joints so that the pipe assembly was flexed and straightened and the appliance moved toward and away from its normal operating location.

Even though the pipe assemblies were capable of flexure during appliance movements the assemblies rigidly resisted movements in certain directions. When appliances turned during movement, bending and wrenching moments were exerted on the pipes and the swivel joints.

Flexible connectors have been proposed to enable turning the appliances while moving them to and away from their operating positions. Flexible connectors have been fashioned from flexible metal hoses and associated fittings for securing the hose ends to the appliances and the supply lines. Such connectors were flexed when the appliance was in its operating position and straightened out to permit moving the appliance from the operating position. The connectors were flexible enough to permit the appliance to turn or shift laterally relative to its operating position if desired.

Where the connector ends were rigidly fixed to the supply line and the appliance, tensioning the connector could damage the metal hose. Flexible metal hoses could be kinked and ruptured when the associated appliance was moved too far or too much force was applied. Kinking was a particular problem if an appliance was roughly pulled from its operating position to a location where the connector was taut and highly tensioned. Safety tethers were employed to limit the appliance travel from its normal location and prevent tautening the connectors, but tethers were not always effective.

A proposal has been made to provide triaxial swivel assemblies at the ends of the connectors. It was thought that these connector ends could be secured to the supply line and appliance in so that the hose could not kink. The theory was that the swivel assemblies would enable the opposite hose ends to align when the connector was straightened. U.S. Pat. No. 5,178,422 issued Jan. 12, 1993 discloses this proposal.

There were drawbacks to the '422 patent proposal. In the first place, the overall gas connector length is prescribed by industry regulations and includes the swivel assemblies. These assemblies were relatively long. Each included three separate members. To insure against kinking either hose end, a swivel assembly had to be placed at each connector end. Because the total swivel assembly length was great, the hose length had to be diminished proportionately.

The three axis swivel assemblies functioned relatively well except when all the axes in one, the other, or both swivel assemblies were substantially aligned in the same plane with the direction of applied hose force. Then the swivel assembly was unable to swivel (or "locked up") as the appliance moved away from its operating position. The normal position for each swivel assembly when the appliance was in its operating position was fully extended, hanging straight down with the hose positioned to pull in a generally horizontal direction. Conditions were thus ripe for swivel assembly lock up to occur.

During lock up, the swivel assembly was placed in bending stress as the applied hose force increased. The swivel assembly frictional forces resisting swiveling increased as hose force increased. Swivelling was even less likely to occur as appliance movement continued. Since the locked up swivel assemblies were long, the appliance could not reach its accustomed location when it was pulled out for cleaning.

The appliance could not move to its cleaning position even with the hose itself fully extended and in tension. Furthermore, because the locked up swivel assembly length was great, the safety tether could be slack when the hose was in tension. In these circumstances it was possible for cleaning personnel to try to force the appliance to its normal cleaning position, damaging the hose or a swivel assembly, or both.

Alignment of the swivel assembly axes with the hose pull direction did not occur every time the appliance was moved; but lock up did occur with sufficient frequency to create a problem. The swivel assembly rest position (illustrated in the '422 patent when the appliance was in the operating position) was with all the axes aligned. Moreover, because of swivel joint friction, the axes and hose pull direction did not have to be perfectly aligned for lock up to occur. This factor contributed to the lock up frequency.

Another shortcoming of the prior art proposals has been the tendency for connectors to experience torsional stresses when installed. The connector end fittings associated with the flexible metal hoses were constructed from threaded fittings hermetically welded to the hose ends. These fittings were attached to receptacles associated, respectively, with the appliance and the supply line. Installing such connectors between a supply line and an appliance created torsional hose stresses unless additional fittings, in the form of unions, were supplied to enable the connections. The unions had free turning nuts which enabled the fitting, union, and the supply line or the appliance to be attached together. When the fittings and unions were appropriately registered with each other the union nut was tightened. This precluded relative rotation between the hose end fitting and the union. Whenever the appliance was moved changes in one hose assembly end position relative to the opposite end created torsional stresses in the connector.

As a consequence, the connectors were required to be associated with a quick disconnect coupling, or equivalent relatively rotatable fitting, when used with a commercial gas appliance like a range or a fryer.

It was discovered that even when a quick disconnect or equivalent coupling was used to relieve torsional hose stresses, appliance movement to and away from the supply line location created stresses which were not dissipated. Whenever an appliance was moved away from the supply line at an angle other than normal to the wall behind the appliance, or when the appliance was turned as it moved, the connector end remote from the quick disconnect coupling was torsionally stressed as a result of movement. Under certain circumstances the torsional stresses tended toward kinking and damage to the hose assemblies.

The present invention provides a new and improved gas appliance connector wherein a flexible metal hose assembly and associated swivel fittings are constructed and arranged to maximize the hose length compared to the overall connector length, insure against swivel fitting lockup, attendant hose kinking and torsional stresses created by appliance movement, yet are uncomplicated and ruggedly constructed.

DISCLOSURE OF THE INVENTION

The present invention provides a connector for delivering combustion gas to a gas fired appliance from a stationary supply line. The appliance moves toward and away from the supply line with the connector straightening, flexing and tending to twist between them as the appliance moves. The connector comprises a flexible hose assembly and first and second swivel fittings. The first swivel fitting is connected to the supply line and comprises a body and a swivel member connected together for movement relative to each other and conducting gas from the supply line. The second swivel fitting is connected to the appliance and comprises a second body and a second swivel member connected together for movement relative to each other and conducting gas to the appliance. The hose assembly extends between the first and second swivel fittings and comprises a flexible hose member and an antitorsion fitting. The antitorsion fitting forms one end of the hose assembly and is connected to one of the swivel fittings. The antitorsion fitting comprises a pintle member hermetically fixed to the hose member, a nipple member fixed to the swivel fitting and a bearing and sealing arrangement between the pintle and nipple members. The pintle and nipple members define flow passages therethrough for conducting gas to the appliance with the nipple member mounted on the pintle member for rotation relative thereto. The bearing and seal arrangement is disposed between the pintle and nipple members for facilitating relative rotation between the nipple member and the pintle member and blocking gas flow from the passages along the juncture of the nipple and pintle members. The nipple and pintle members rotate relative to each other to prevent torsional stress in the hose member when the appliance moves relative to the supply line.

In a preferred embodiment of the invention first and second antitorsion fittings are connected to respective opposite hose member ends. Each antitorsion fitting comprises a pintle member hermetically fixed to the hose and a relatively rotatable nipple member for preventing torsional stress in the hose member.

Other features and advantages of the invention will become apparent from the following detailed description of a preferred embodiment made with reference to the accompanying drawings which form part of the specification.

PRIOR ART

Figure 1:
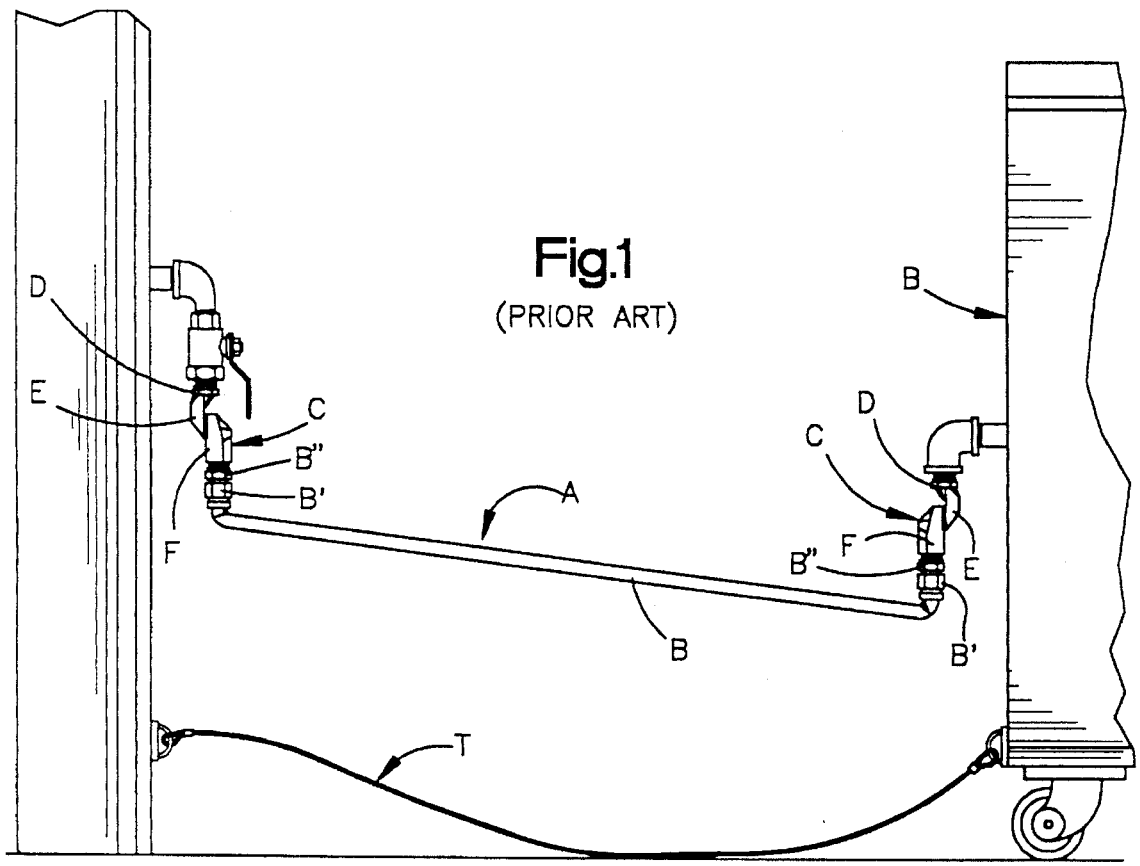
FIG. 1 is a fragmentary elevational view of a prior art connector installed for delivering gas to a commercial cooking appliance, shown with the appliance moved toward a position permitting cleaning behind it.

A conventional connector A for delivering gas from a supply line to a commercial cooking range B is illustrated by FIG. 1 of the drawings. The range B is equipped with casters to facilitate its movement and is normally positioned next to a wall. The range is pulled away from the wall to enable cleaning behind and beneath it. The connector A straightens from its normal, flexed condition as the range moves. A safety tether T attached between the wall and range is intended to prevent the connector from being overtensioned.

The connector A includes a flexible hose assembly B and swivel assemblies C for attaching the connector to the range and to the supply line. The hose assembly B comprises a helically corrugated flexible metal hose having fittings B' welded to its opposite ends. Each fitting B' is fixed to a swivel assembly by a union b" so that the connection between the hose end fittings B' and the respective swivel assembly is fixed and rigid.

The swivel assemblies C are constructed with three separate swivel members D,E,F defining three distinct axes. The multipart swivel assemblies C are of a type often employed with hoses used to fill automotive vehicle gasoline tanks. This swivel assembly construction is intended to produce a high degree of articulation so that the hose assembly is not kinked and damaged when the appliance is moved away from its normal location.

In the event the appliance is shifted in a horizontal plane, or turned, as it is moved away from its position illustrated in FIG. 1, the hose assembly tends to twist about its own centerline. The fixed joints between the unions B" and the hose end fittings B' tend to impart torsional stress to the hose which is undesirable.

When the connector A is in its normal, flexed condition the swivel assemblies C are gravity biased to hang vertically downwardly, fully extended and aligned with the flexed hose assembly. In this position, the axes of each swivel assembly are substantially aligned in a vertical plane. When these axes and the direction of pull exerted by the hose assembly as it straightens are all aligned, the swivel assembly locks up in its fully extended condition. Locked up swivel assemblies do not articulate. Swivel assembly lock-up does not occur each time the range is moved. It occurs once in a while, unexpectedly.

Because the three member swivel assemblies are relatively long, when one or both of them locks up in the aligned vertical position the length of range travel away from the wall is materially shortened. Cleaning personnel attempting to move the range may assume the movement limitation is due to an obstruction and pull violently on the range. This can kink and damage the hose, as illustrated in FIG. 1.

It should be noted that the hose assembly might be damaged even though the protective tether is in place. This is because the aggregated length of the locked swivel assemblies significantly shortens the extent of the range travel compared to the travel expected when the swivel assemblies articulate. When the tether length exceeds the hose length between the locked swivel assemblies the tether will not protect against kinking.

BEST KNOWN MODE FOR CARRYING OUT THE INVENTION

Figure 2:
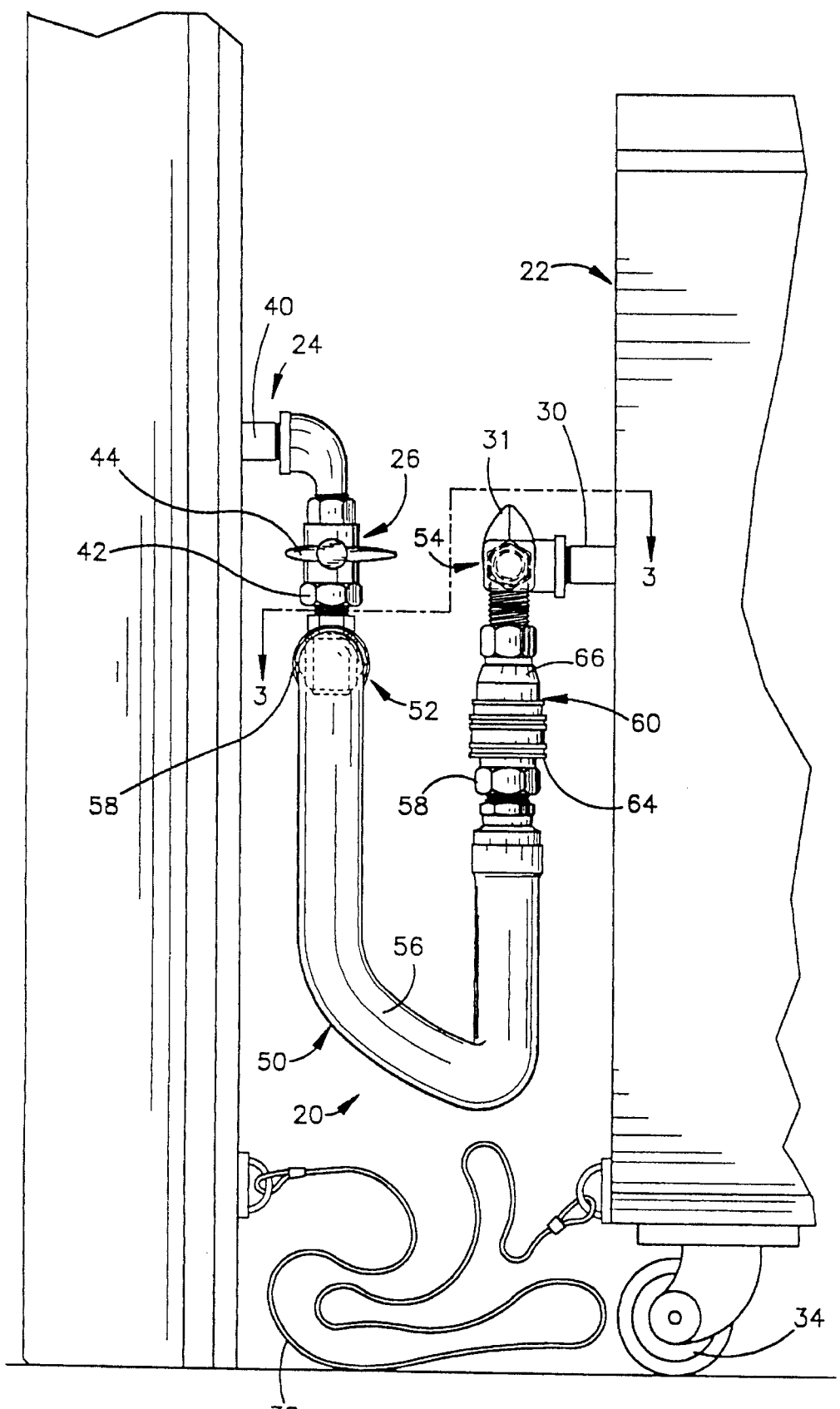
FIG. 2 is a fragmentary elevational view of a connector constructed according to the invention installed for delivering gas to a commercial cooking range with the range in its normal operating location.
Figure 4:
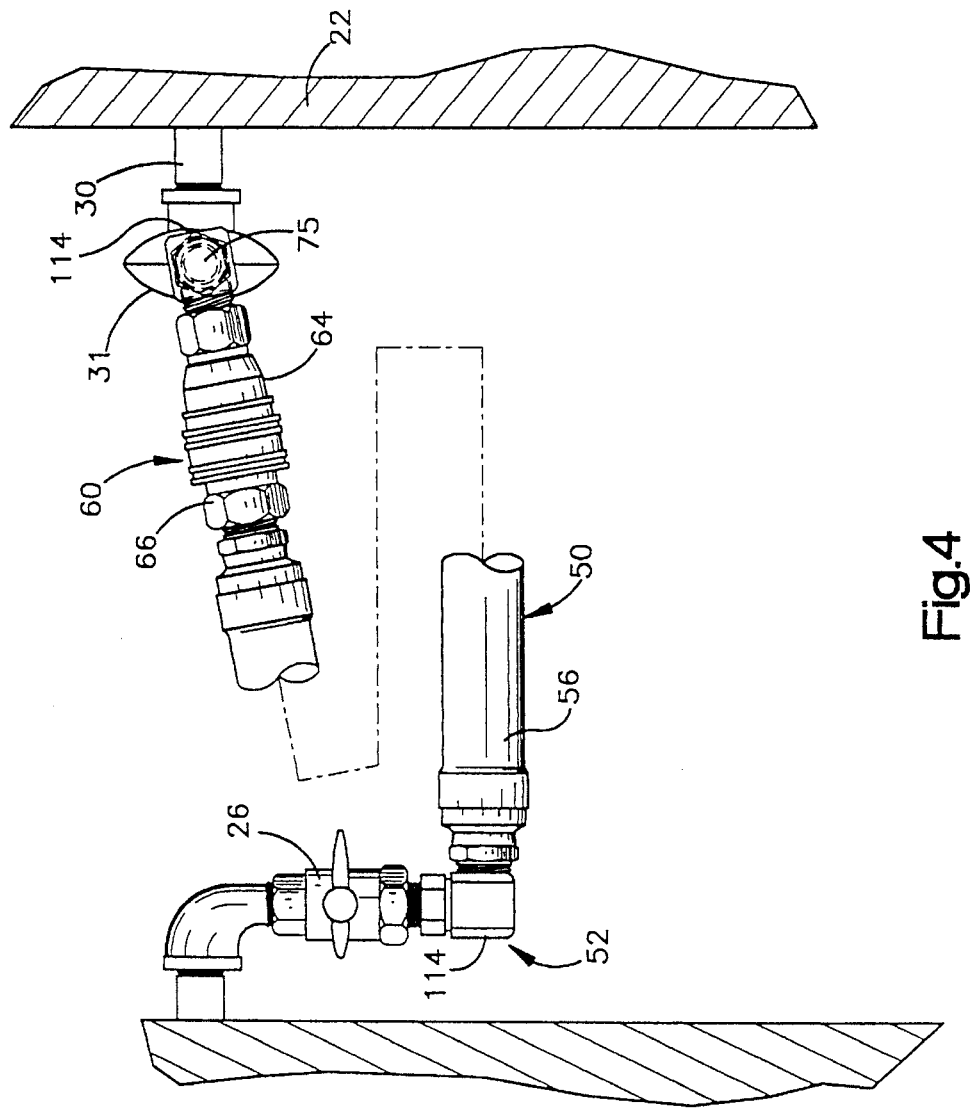
FIG. 4 is a view similar to FIG. 2 with the range moved to its normal cleaning location with portions broken away and illustrated foreshortened.
Figure 3:
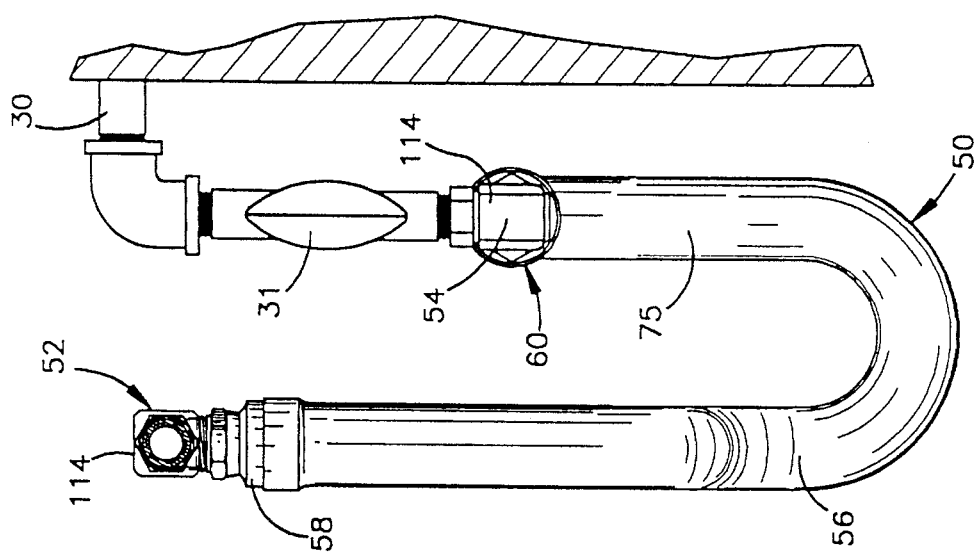
FIG. 3 is a fragmentary cross sectional view seen approximately from the plane indicated by the line 3—3 in FIG. 2.

A flexible connector 20 constructed according to the present invention is illustrated in FIGS. 2–4 for delivering combustion gas to a commercial cooking range 22 from a stationary gas supply line 24. The supply line 24 is conventional and illustrated as supported by a wall and having a manual shut-off valve 26 at the line terminus nearest the connector 20.

The range 22 may be of any suitable or conventional construction and is illustrated as including a gas inlet line 30 projecting from and extending horizontally parallel to the back of the range and a pressure regulator 31 attached to the line 30. The regulator defines a threaded receptacle by which it is connected to the connector 20. The range 22 is normally positioned adjacent the wall when in use, with the connector 20 in a flexed condition between the wall and the range.

Institutional kitchens must be cleaned frequently. The range 22 is movable away from the wall to facilitate cleaning beneath and behind it, as well as to enable servicing and maintenance as necessary. Casters 34 permit relatively easy manual range movement toward and away from the normal position adjacent the wall even though the range may be quite massive. The connector 20 is designed to maintain the range 22 connected to the gas supply line 24 during the temporary range displacement. As the range moves away from the wall the connector 20 straightens out from its flexed condition.

A safety tether 38 attached between the wall and the range limits the range travel. The tether prevents the connector 20 from completely straightening and becoming overtensioned. The tether 38 is preferably formed by a sheathed cable extending between eyes fixed in the wall and the appliance with a length adjusting cable clamp (not illustrated) disposed between its ends.

The illustrated supply line 24 comprises a supply conduit (not shown) having a supply pipe 40 branching toward the range 22. The shut-off valve 26 is screwed on to the projecting supply pipe end via a pipe elbow. The supply conduit is located within the wall behind the range in the illustrated embodiment of the invention. The supply conduit may alternatively extend along the wall outer surface supported by suitable pipe hangers.

The manual shut-off valve 26 is mounted adjacent the wall accessible to persons in front of the range 22. The valve 26 defines an internally threaded receptacle 42 by which it can be screwed to the connector 20, a street elbow, a pipe nipple, or the like. The shut-off valve 26 is typically oriented so that the axis of the receptacle 42 extends vertically downwardly parallel to the wall (as illustrated in FIG. 2) or horizontally parallel to the wall. The valve handle 44 is located on one side of vertically oriented valves and on the top side of horizontal valves to assure accessibility to the user.

The connector 20 delivers gas to the range 22 and is so constructed and arranged that it facilitates moving the range for cleaning, maintenance and inspection without disconnecting the range from the supply line. The connector 20 comprises a hose assembly 50 and first and second swivel fittings 52, 54 at respective opposite hose assembly ends for connection to the supply line and to the range 22.

The hose assembly 50 preferably comprises a composite hose 56, fittings 58 attached at the hose ends and an optional quick disconnect coupling 60 for detaching the range 22 from the hose without shutting off the gas supply.

The composite hose 56 may be of conventional construction. The preferred hose 56 comprises a thin walled, stainless steel annularly or helically corrugated hose member, a braided stainless steel wire reinforcing sheath for the hose member and a relatively thick seamless plastic shroud. The shroud hermetically encapsulates the hose member, the sheath, and the junctures of the hose member and the fittings 58. The composite hose construction is stiffly resilient when flexed for range repositioning yet provides strength, toughness and gas impermeability.

The ends of the metal hose member and the sheath are welded to the fittings 58. Each fitting 58 terminates in an externally threaded projecting nipple constructed to be hermetically joined to an internally threaded member. The illustrated fittings 58 are stainless steel, but may be constructed from any suitable material.

The quick disconnect coupling 60 is illustrated as installed in the connector 20 near the range 22 so that the range can be disconnected from the gas supply pipe 40 without closing the manual shut-off valve 26. The illustrated coupling 60 comprises a female coupling unit 64 and a male coupling unit 66. The unit 64 is connected to a hose fitting 58 at the hose end nearest the range 22 while the unit 66 is connected to the swivel fitting 54 at the range 22. The female unit 64 contains a valve mechanism which automatically closes when the male and female units are detached so gas can not escape when the range is disconnected from the supply line via the coupling 60. The valve mechanism further includes a heat fusible member (not illustrated) which, in the presence of a fire, melts and enables the valve to close, thus cutting off gas flow to the appliance. The male unit 66 actuates the valve mechanism to open communication between the supply line and the range when the units 64, 66 are coupled.

The coupling 60 is conventionally constructed and as such incorporates a detent mechanism and seal for detachably coupling the units 64, 66 together in a sealed relationship.

The detent mechanism permits relative rotation between the male unit 66 and the female unit 64 without interrupting the seal. When the range is moved from one position to another the connector 20 flexes or straightens and the units 64, 66 rotate relative to each other. This relative motion precludes creation of twisting stresses in the hose assembly by the range movement. As noted, the coupling 60 is an optional feature of the connector 20. Where the coupling 60 is not used, the hose assembly may have a slight tendency to twist on itself when in its flexed condition because of stresses; but these stresses are not so great that any structural damage occurs unless the connector is tensioned while under stress.

Figure 5:
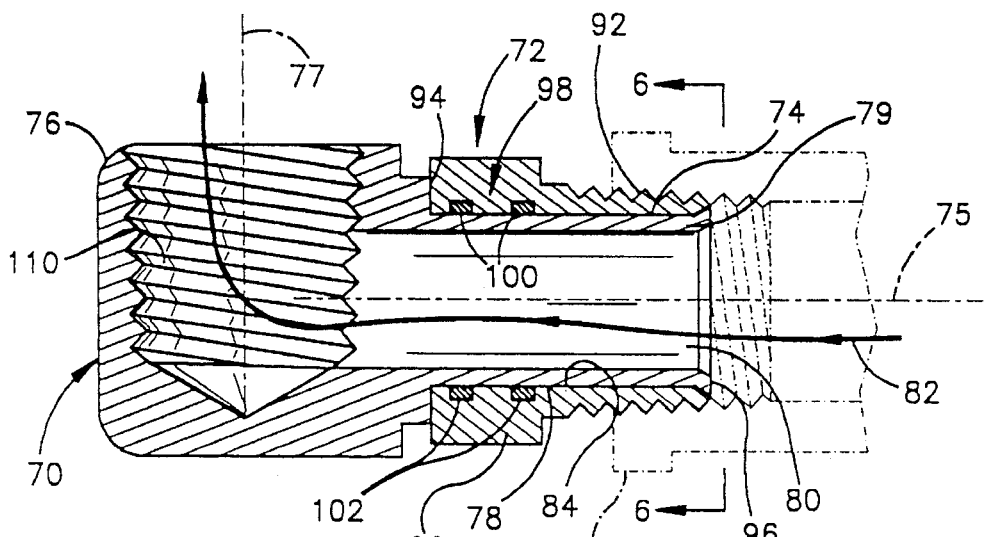
FIG. 5 is an elevational view of a swivel fitting shown in FIG. 2 constructed according to the invention with parts broken away and shown in cross section.
Figure 6:
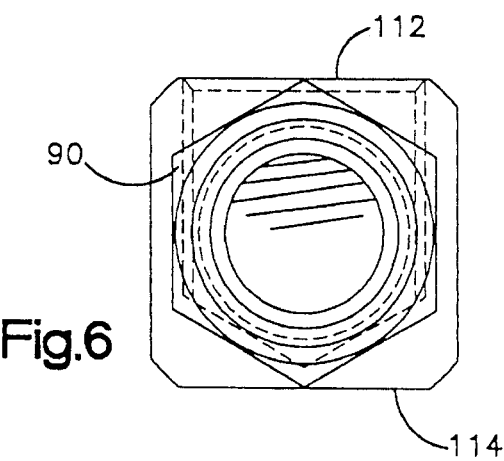
FIG. 6 is a view seen approximately from the plane of the line 6—6 of FIG. 5.

The swivel fitting 52 connects the hose assembly 50 to the supply line 24 so that the hose assembly end adjacent the supply line swivels relative to the supply line when the hose flexes and straightens during range movement. The swivel fitting 52 is illustrated in detail in FIGS. 5 and 6 as comprising a body 70 and a swivel member 72 carried by the body 70. The illustrated and preferred body 70 is elongated and defines a first body end 74, proximal the supply line, associated with the swivel member 72. The body end 74 projects toward the supply line along a longitudinal body axis 75. A second, opposite body end 76 is located proximal, and connected to, the hose assembly. The hose assembly joins the body 70 along a second axis 77 extending transverse to the axis 75. As illustrated, the axes 75, 77 are normal to each other and intersect.

The first body end 74 defines an opening 80 surrounding a gas flow path 82 extending from the supply pipe 40 through the fitting 52 to the hose assembly. The swivel member 72 likewise defines an opening 84 surrounding the gas flow path 82. The swivel member 72 and the first body end 74 are sealingly engaged and relatively rotatable with respect to each other about the axis 75. The axis 75 extends centrally through the openings 80, 84 and along the gas flow path 82.

The illustrated first body end 74 is a tubular, cylindrical body wall centered on the axis 75. The gas flow path 82 is defined in part by the inner wall face. The swivel member 72 rides on the outer cylindrical wall surface 78 and is maintained in position by a radially outwardly flared body terminus 79.

The swivel member 72 is tubular and defines a nut-like body portion 90, a projecting cylindrical threaded portion 92 projecting from the body portion toward the supply line, and a smooth cylindrical bore extending through the member 72 and centered on the axis 75. The body portion 90 is relatively thick in its radial dimension and its exterior forms wrench flats. The wrench flats facilitate screwing the threaded swivel member portion 92 into the valve receptacle 44 with adequate torque to assure a hermetic union.

The swivel member body portion 90 seats against an axially facing shoulder 94 formed on the body 70. The projecting threaded portion 82 defines an outwardly diverging frusto-conical chamfer surface 96 at its terminus. The surface 96 confronts the outwardly flared body terminus 79 to retain the swivel member 72 in axial alignment with the body 70.

A seal assembly 98 between the swivel member and the cylindrical outer surface of the body end 74 enables relative rotation without leakage. The seal assembly comprises O-rings 100 disposed in respective grooves 102 in the interior wall of the nut-like body portion 90. The grooves 102 do not materially weaken the body portion 90 because its radial thickness is relatively great. The O-rings are compressed in the grooves and resiliently engage the body end 74 to seal the juncture of the body 70 and the swivel member 72 while enabling relative rotation.

The second body end 76 is illustrated as having a square or rectilinear cross sectional shape (FIG. 6) so its sides are flat panel-like faces as is its end. A tapped hole 110 extends into the body end 76 on the axis 77 through one side face 112 to form a receptacle. The flat panel-like body faces facilitate gripping the body while screwing the hose assembly into the receptacle 110.

The hole, or receptacle, 110 extends into the body 70 beyond the axis 75. The gas flow path 82 makes a turn passing through the swivel fitting 52. A hose fitting 58 is hermetically screwed into the receptacle 110 so that the hose assembly end attached to the fitting 52 is rotatable in a plane transverse to the axis 75 when the range moves. The hose assembly end thus moves in a tight arc about the swivel axis 75.

When the connector 20 is attached to the supply line as described, the axes 75, 77 can not align in such a way that the swivel fitting 52 locks up, does not rotate and kinks the hose when the range is moved away from the wall. Moreover, the distance between the axis 77 and the remote end of the swivel member 72 is relatively small, i.e. less than two hose assembly diameters. In the event the range 22 is pulled from the wall to the limit of the connector length, bending moments exerted on the fitting 52 by the applied connector pulling force are minimized and less than the bending moments experienced by prior art multi-axis swivel devices.

The swivel fitting 54 is constructed identically to the fitting 52. The fitting 54 is screwed into the regulator 31 at the range and the male quick disconnect coupling member 66 is screwed into the body receptacle 110. See FIGS. 2–4. The axis 75 of the swivel fitting 54 is horizontal so the hose assembly end attached to the fitting 54 rotates in a vertical plane about the axis 75.

When the range is in its operational position adjacent the wall (FIG. 3), the hose assembly 50 extends horizontally from the swivel fitting 52 substantially parallel to the wall while the hose assembly end at the fitting 54 extends downwardly from the range gas inlet. The hose body flexes in that it droops somewhat and curves between the ends. The connector length is sufficiently short that the hose 56 does not contact the floor when it flexes. Put another way, the sum of the distance from the floor to the regulator receptacle and the distance from the floor to the valve receptacle 44 is greater than the length of the connector 20.

The orientation of the hose assembly ends and the fittings 52, 54 illustrated by FIGS. 2 and 3 is particularly desirable when the shut off valve 26 and the range inlet line 30 are located at substantially different vertical distances from the floor and/or are distanced substantially apart horizontally. The horizontal separation between the range inlet and the shut off valve is compensated by the fitting 52 which swivels about a vertical axis as the range is moved away from the wall to align its hose assembly end with the swivel fitting 54. Vertical separation between the valve and the inlet line is compensated by the fitting 54 swiveling about a horizontal axis to align its end of the hose assembly with the fitting 52.

As the range is returned to its operating position (FIG. 3) the fitting 54 initially swivels as the hose droops and flexes under the influence of gravity. Slight hose twisting and horizontal separation between the inlet and supply lines creates sufficient torque to swivel the fitting 52 to its position illustrated by FIG. 3.

Because the receptacle 110 extends beyond the swivel fitting axis 75 the hose assembly end screwed into the receptacle 110 is located close to the body face 114 opposite the face 112. Flexible connectors are subject to regulations governing their overall lengths. Generally speaking, permissible connector lengths are relatively short. Because the composite hose constructions are inherently stiff, resistance to flexing increases as the length of the hose is reduced. Any given length connector should exhibit optimum flexibility. Connector flexibility is enhanced by maximizing the proportion of the connector length attributable to hose.

The overall length of the connector 20 is determined by straightening the connector to full length and measuring the distance between the body faces 114 of the swivel fittings 52, 54. The faces 114 are each quite close to a respective hose assembly end and the swivel fitting body dimensions between the body faces 112, 114 are less than about 50 mm. The compact construction of the fittings 52, 54 thus contributes to maximizing hose length. In the illustrated connector 20 each face 114 is much less than 50 mm from the adjacent hose assembly end.

Figure 7:
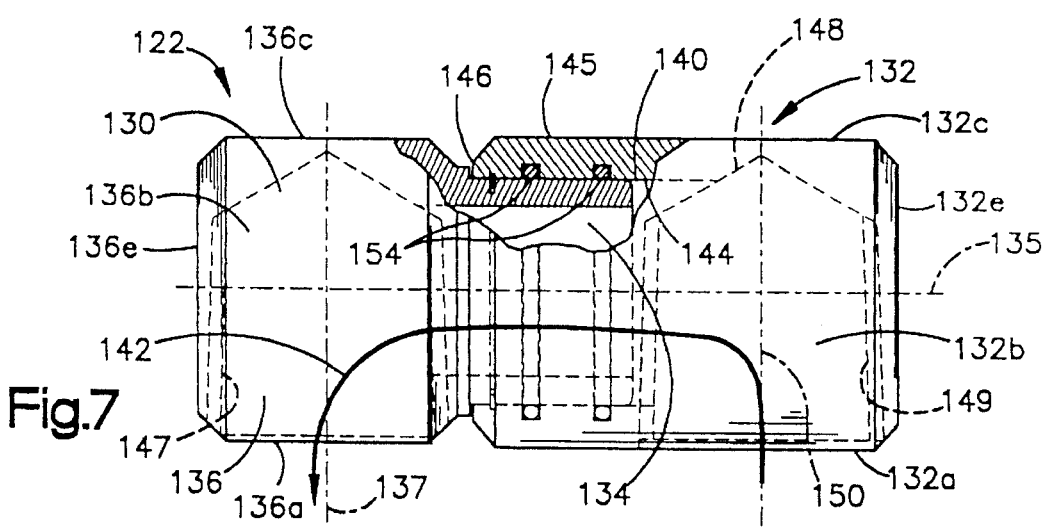
FIG. 7 is an elevational view of a modified swivel fitting constructed according to the invention with parts broken away and shown in cross section.
Figure 8:
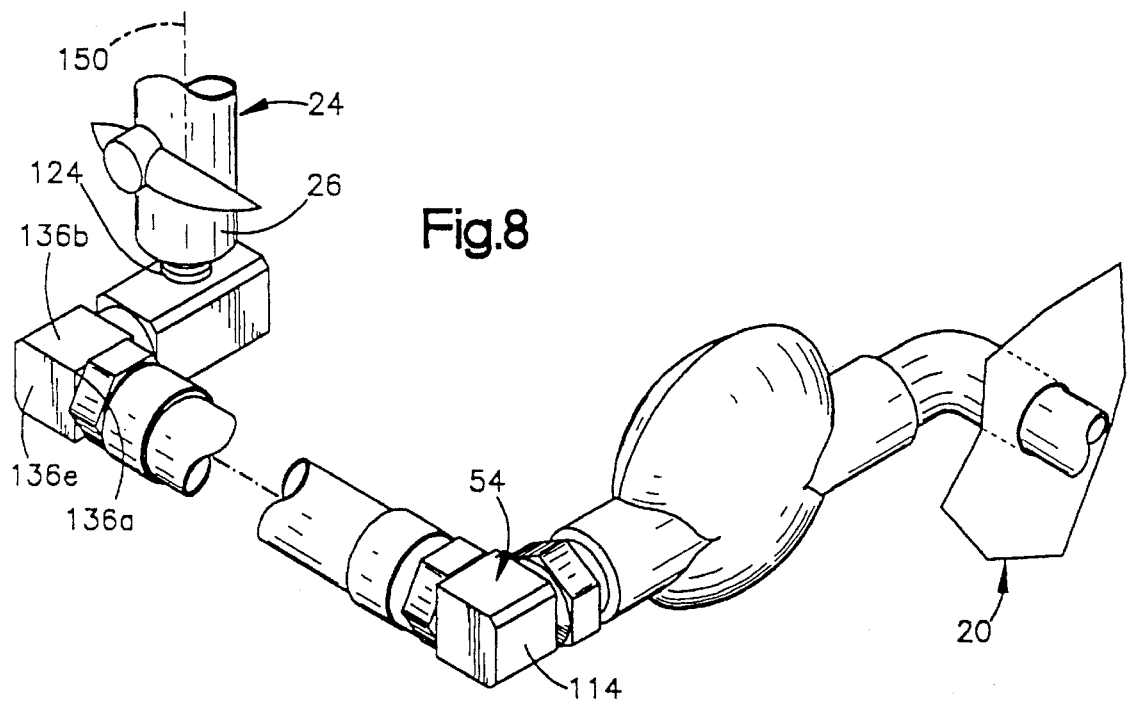
FIG. 8 is a fragmentary elevational view of a modified connector installed for delivering gas to a range in its normal operating location.
Figure 9:
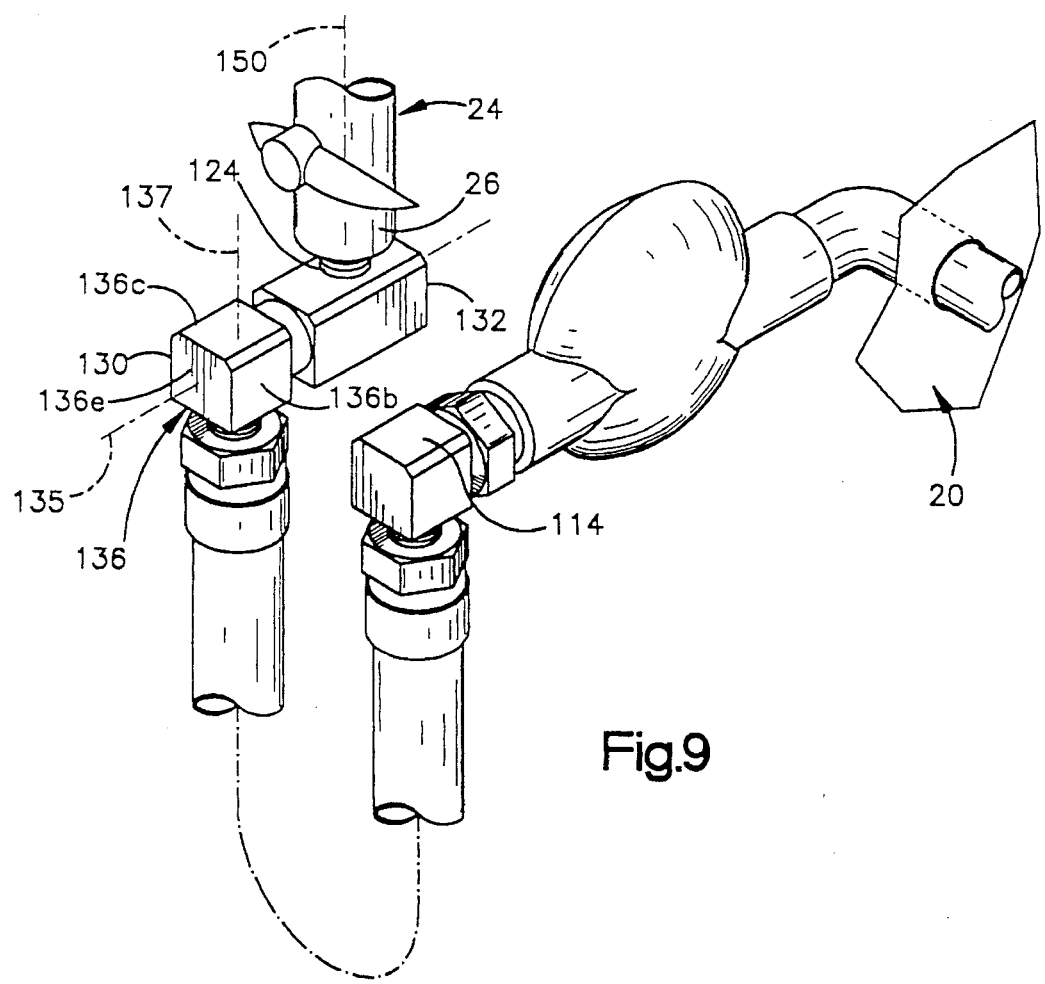
FIG. 9 is a view similar to FIG. 8 with the range moved to a cleaning location.

An alternative connector 120 is illustrated by FIGS. 7–9 of the drawings. The connector 120 extends between the supply line 24 and the range 20 and is in all material respects constructed like the connector 20 except for the swivel fitting 122 connected to the supply line. The range 20 is the same as the range of FIGS. 2 et seq. as is the supply line 24. The shut-off valve 26 is equipped with a short pipe nipple 124 connecting the fitting 122 to the valve. The illustrated connector 120 does not include a quick disconnect coupling 60.

The swivel 122 is constructed and arranged to swivel about a horizontal axis 135 (FIGS. 8 and 9) as the range moves between its operating and cleaning positions. In the operating position (FIG. 9) the flexed connector 120 droops between the wall and range. The hose ends are each oriented to extend vertically downwardly by their respective swivel fittings. When the range moves toward its cleaning position (FIG. 8) each fitting 122, 54 swivels about its horizontal axis as the connector straightens. The connector ends swivel in vertical planes about their respective swivel axes when the range moves.

The swivel fitting 122 itself is best illustrated by FIG. 7 as comprising a fitting body 130 and a swivel member 132 carried by the body 130. The illustrated and preferred body 130 is elongated and defines a first body end 134 associated with the swivel member 132 and proximal the supply line. The body end 134 projects toward the supply line along the longitudinal body axis 135. A second, opposite body end 136 is located proximal and connected to the hose assembly. The hose assembly joins the body 130 along a second axis 137 extending transverse to the axis 135. As illustrated, the axes 135, 137 are normal to each other and intersect.

The first body end 134 defines an opening 140 surrounding a gas flow path 142 extending from the supply line through the fitting 122. The swivel member 132 likewise defines an opening 144 surrounding the gas flow path 142. The swivel member and the first body end 134 are sealingly engaged and relatively rotatable with respect to each other about the axis 135 which extends through the openings 140, 144 and the gas flow path 142.

The illustrated first body end 134 is a tubular, smooth cylindrical body extension centered on the axis 135. The gas flow path 142 is defined in part by the inner wall of the body extension. The swivel member 132 rides on the outer cylindrical body extension wall surface 145. The second body end 136 has a rectilinear or square cross sectional shape defined by flat body panels, or faces, 136a–d and a flat panel-like end face 136e. A tapped hole 147 extends into the body end 136 on the axis 137 through one side face 136a to form a hose fitting receptacle. The flat panel-like body faces facilitate manually gripping the body while screwing the hose assembly into the receptacle.

The hole, or receptacle, 147 extends into the body 70 beyond the axis 135. The hose fitting 58 is hermetically screwed into the receptacle 147 so that the hose assembly end attached to the fitting 122 is rotatable in a plane transverse to the axis 135 when the range moves.

The swivel member 132 is tubular and has a square or rectilinear cross sectional shape forming flat panel-like body faces 132a–d and a flat panel-like end face 132e. The swivel member defines an axially extending cylindrical bore 148 surrounding the body end 134 on the axis 135 and terminating short of the end face 132e. A tapped hole, or receptacle, 149 extends through the body face 132a along an axis 150 transverse to and intersecting the axis 135.

The pipe nipple 124 is hermetically threaded into the receptacle 149 and tightened so the swivel fitting 122 is fixed to the nipple 124 with the axis 135 extending parallel to the wall. The axes 150 and 137 are disposed in parallel planes.

The swivel member 132 and the body 130 are maintained assembled together, yet free to rotate with respect to each other, by a snap ring 146 disposed in axially aligned ring grooves in the swivel member bore 148 and the body surface 145. The juncture of the body 130 and swivel member 132 is sealed by axially spaced O-rings 154 which are resiliently compressed into ring grooves in the bore 148 and sealingly engage the body surface 145.

Figure 10:
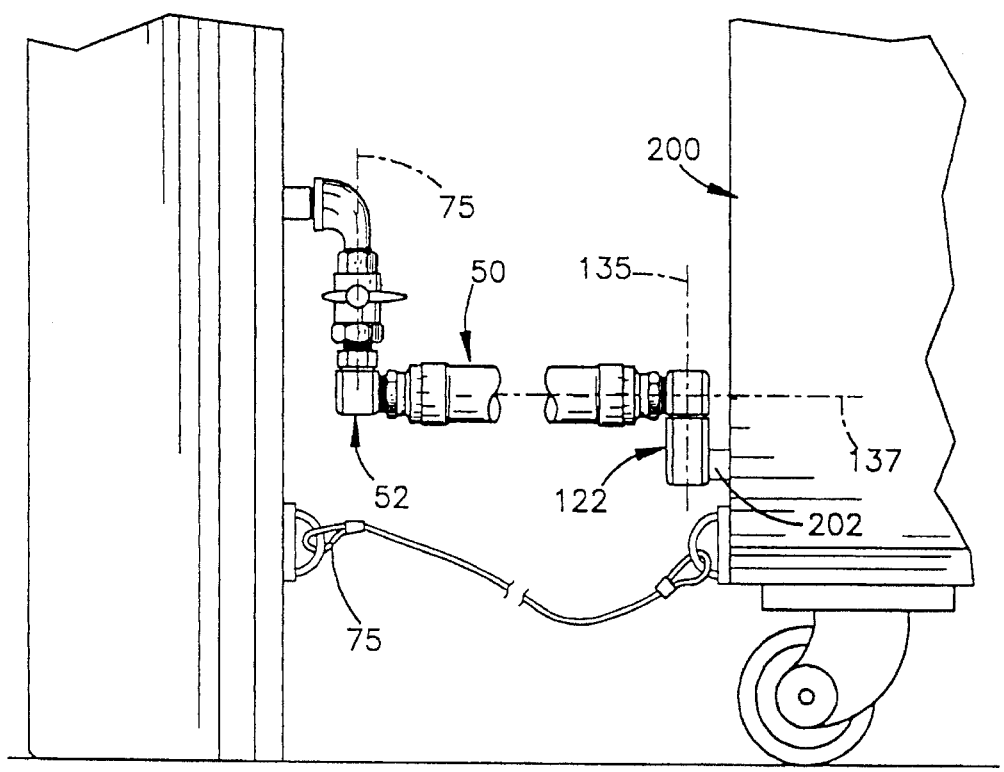
FIG. 10 is a fragmentary elevational view of another modified connector installed for delivering gas to a commercial fryer in its normal operating location.
Figure 11:
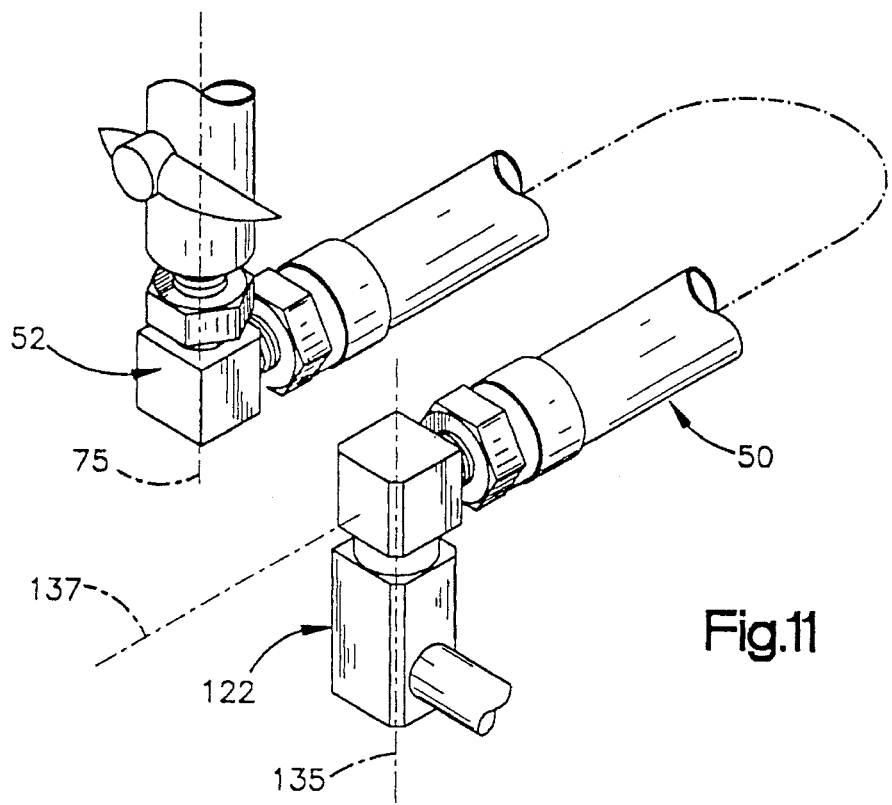
FIG. 11 is a view similar to FIG. 10 with the fryer moved to its cleaning location; and, FIG. 12 is an elevational view of a still another modified connector construed according to the invention with parts broken away and parts illustrated in cross section.

FIGS. 10 and 11 illustrate a commercial fryer 200 coupled to the gas supply line via a connector 220. The fryer 200 may be of any conventional or suitable construction and is not, therefore, described in detail. The illustrated fryer 200 is somewhat typical of this type of appliance in that a gas inlet pipe 202 projects from the back of the fryer toward the wall at a location close to the floor. In this environment a connector which droops downwardly from its ends when the appliance moves toward its operative position can engage the floor which is undesirable. When a connector engages the floor it can impede appliance movement as well as becoming fouled by foreign materials from the floor. The new connector 220 couples the fryer to the supply line without drooping toward the floor.

The connector 220 employs a swivel fitting 52 connected to the supply line (as described above in reference to FIGS. 2–6), a swivel fitting 122 (constructed as described in reference to FIGS. 7–9) connected to the fryer, and a hose assembly 50 extending between the swivel fittings. The swivel fitting 122 is screwed onto the fryer inlet pipe so that the hose assembly end attached to the fitting 122 and disposed on the axis 137 rotates in a horizontal plane about the axis 135.

When the fryer 200 is moved to its operating position adjacent the wall the hose assembly flexes and the swivel fittings 52, 122 pivot the hose assembly ends about the vertical axes 75, 135, respectively. The hose assembly flexes essentially horizontally because the fittings 52, 122 maintain the hose assembly end regions horizontally oriented. The stiffly resilient nature of the hose assembly results in the central flexed region of the hose assembly remaining essentially in a horizontal orientation rather than drooping downwardly to the floor.

It should be noted that, if desired, the swivel fitting 122 can be replaced by the combination of a swivel fitting 52 (or 54) and a pipe elbow (not illustrated). In such an arrangement, connected to the fryer 200 for example, the pipe elbow is threaded onto the fryer inlet pipe 202. The free pipe elbow end extends vertically upwardly. The fitting 52 is threaded onto the free end so that the axis 75 is vertical.

Figure 12:
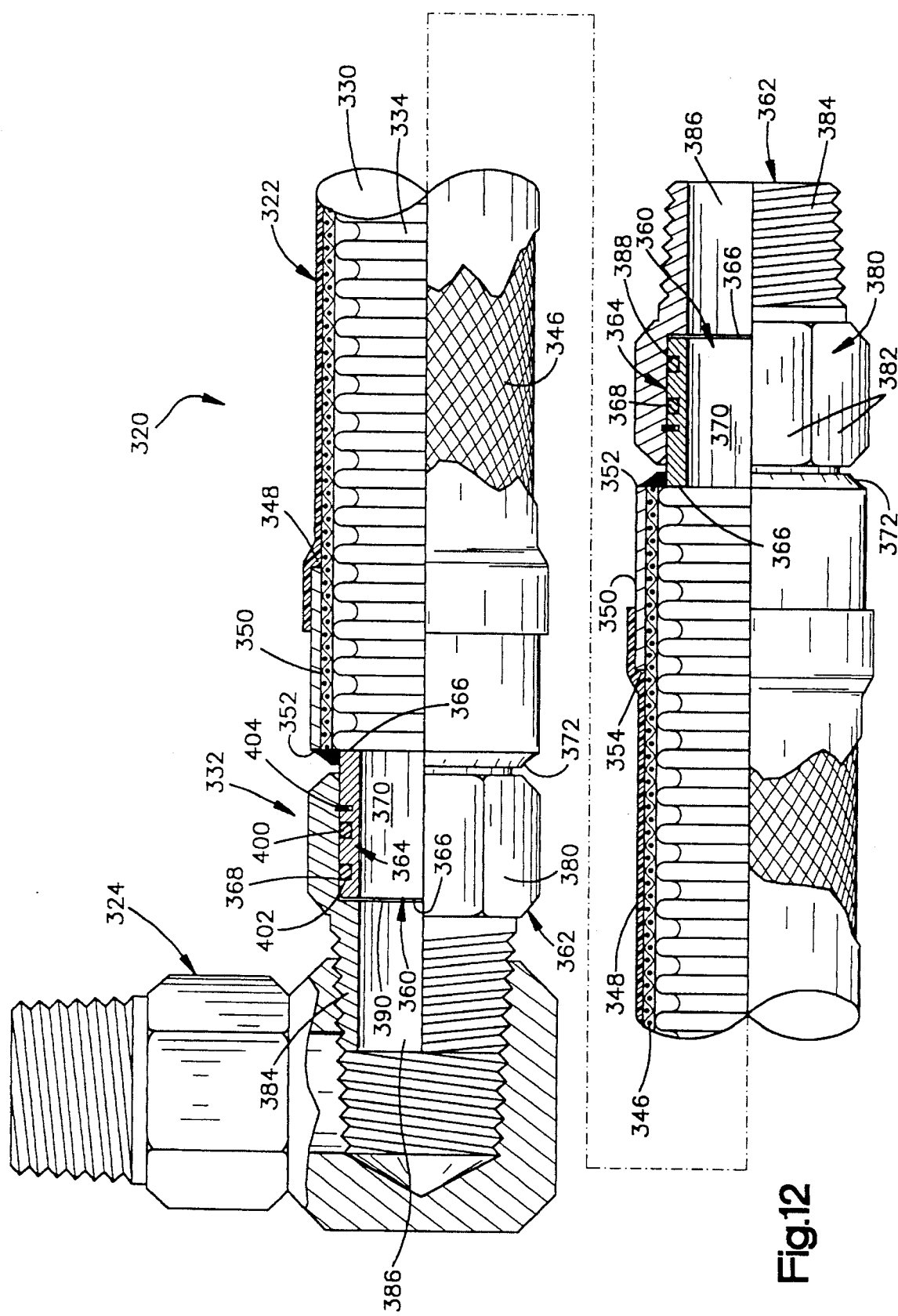

Another modified connector 320, constructed to minimize torsional stresses is illustrated in FIG. 12. The connector 320 comprises a hose assembly 322 having identical swivel fittings 324 (only one of which is illustrated) at respective ends. The swivel fittings 324 are identical to the swivel fittings 52 (or 54) described in reference to FIG. 5. Alternatively, one or both of the fittings 324 may be identical to the fitting 122 described in reference to FIG. 7. The hose assembly 322 preferably comprises a composite hose 330 and antitorsion fittings 332 attached at the hose ends to free the hose for torsional stress relieving movement relative to the swivel fittings 324.

Antitorsion fittings 332 have been illustrated and are preferred at both ends of the hose because torsional stresses are eliminated by such a construction. Furthermore, the need for unions is eliminated as is the need for a quick disconnect coupling associated with the connector to act as a torsional stress reducing agent. Use of a quick disconnect coupling is nevertheless encouraged since such a coupling functions to cut off the gas in case of fire and to enable the appliance to be disconnected from the supply line conveniently. It is possible to construct and use a hose having only one antitorsion fitting. In such a construction torsional hose stresses resulting from appliance movement are reduced from what would otherwise exist in the absence of any antitorsion fittings. Use of a single antitorsion fitting can eliminate the need for a union when installing the connector.

The preferred and illustrated hose 330 comprises a thin walled, stainless steel annularly corrugated hose member 334, a woven stainless steel wire reinforcing sheath 346 extending about the hose member between the fittings, a relatively thick imperforate plastic shroud 348 coextending with and encircling the sheath, and an end ferrule 350 at each end of the hose 330 for securing the hose components together. The sheath 336 is preferably woven in place on the hose member by a so-called braiding machine. Accordingly the sheath tightly surrounds the hose member.

The ferrules 350 are identical cylindrical stainless steel rings whose ends 352 adjacent the fittings 332 are axially aligned with and welded to the ends of the hose member 334 and the sheath 336. The hose member 334, sheath 346 and the ferrules 350 thus form a unitary construction. The fact that the sheath 346 is tightly woven onto the hose member and welded in place enables the sheath to perform its essential function of reinforcing the hose member 334 against axial elongation as a result of overtensioning.

The shroud 348 is preferably formed from a polyvinylchloride coating which hermetically encapsulates the hose member, the sheath, and the ends 354 of the ferrules remote from the fittings 332. The shroud 348 shields the sheath from grease and dirt which might otherwise be trapped and accumulate in the woven wire interstices.

The weldments forming the ends of the metal hose member, sheath, and ferrules are each hermetically welded to a fitting 332 to provide an air and gas impervious joint between the hose assembly and the fitting. The composite hose construction is stiffly resilient when flexed for range or fryer repositioning yet provides strength, toughness and gas impermeability.

Each antitorsion fitting 332 provides for a positive, fluid tight connection between the hose assembly and the supply line or the appliance without necessitating use of unions. At the same time, the antitorsion fittings assure against torsional stresses in the hose member caused by moving the appliance. The antitorsion fitting 332 comprises a tubular pintle member 360 fixed to the hose assembly, a nipple member 362 riding on the pintle member and secured to the adjacent swivel fitting 324 and a bearing and sealing arrangement 364 between the pintle and the nipple member. The nipple member rotates freely about the pintle member so that the hose assembly can not become torsionally stressed by virtue of twisting forces transmitted between the swivel fitting and the associated hose end fitting.

The pintle member 360 fixes the nipple member 362 to the hose assembly for enabling hose torsion relieving relative rotation between the hose assembly end and the adjacent swivel fitting. The pintle member is formed by a straight cylindrical tube having annular faces 366 at its opposite ends, a smooth outer surface 368 confronting the nipple member and a cylindrical gas flow channel 370 extending through it in alignment with the hose member. One pintle member end face 366 is butted up against the hose assembly end and hermetically welded into place by a weldment 372 extending continuously around the juncture of the hose end and the pintle member.

The nipple member 362 screws into its associated swivel fitting while remaining free to rotate relative to the pintle member and hose assembly. The nipple member is a tubular, generally cylindrical member having an enlarged nut-like end section 380 formed by a series of circumferential wrench flats 382 and a projecting threaded section 384 formed by pipe threads which taper slightly to a smaller diameter proceeding away from the section 380. The tubular nipple member interior is defined by a smooth cylindrical flow channel 386 aligned with the pintle flow channel 370, a smooth cylindrical bore 388 surrounding and confronting the pintle surface 368 and a shoulder 390 extending adjacent a pintle end face 366 between the channel 386 and the bore 388.

The bearing and seal arrangement 364 both seals the juncture of the pintle and nipple members and serves as a bearing between them while locking them together. The illustrated arrangement 364 comprises a pair of parallel O-ring type seal members 400 compressed between the nipple bore 388 and the pintle member so that the nipple member rides on the O-rings, a pair of ring grooves 402 formed in the pintle member face 368 for receiving respective O-rings, and an internal snap-ring 404 disposed in axially aligned grooves in the pintle member face 368 and the nipple member bore 388. The snap-ring 404 primarily functions to secure the members 360, 362 in their assembled condition as illustrated.

The connector of FIG. 12 is installed and used with a safety tether like the tether 38. A safety tether used with the connector 320 can be of a length which is a significant proportion of the connector length thus allowing the appliance to be moved maximally away from the supply line. Safety tethers have been required to be used with commercial cooking appliances to prevent overtensioning and kinking gas connectors when the appliance is pulled away from the supply line. Where the connector of FIG. 12 is installed, pulling the appliance away from the supply line will not kink and damage the connector 320 because of its ability to align between the supply line and the appliance without torsional stresses. Instead of protecting the connector 320 the safety tether 38 thus primarily functions to protect the supply line from being pulled from the wall by the connector when the appliance is roughly moved.

While preferred embodiments of the invention have been illustrated and described in detail, the present invention is not to be considered limited to the precise constructions disclosed. Various adaptations, modifications and uses of the invention may occur to those skilled in the art to which the invention relates and the intention is to cover hereby all such adaptations, modifications and uses which fall within the spirit or scope of the appended claims.

Having described my invention I claim:

1. A flexible connector for delivering fluid at superatmospheric pressure from one end proximal to a stationary supply line, the connector straightening, flexing and tending to twist as the distal connector end moves toward and away from the supply line, said connector comprising:

a first swivel fitting connected to the supply line and comprising a body and a swivel member connected together for movement relative to each other and conducting fluid from the supply line;

a second swivel fitting at the distal connector end and comprising a second body and a second swivel member connected together for movement relative to each other and conducting fluid from the distal connector end; and, a hose assembly extending between said first and second swivel fittings, said hose assembly comprising;

a flexible metal hose member; and, an antitorsion fitting forming one end of said hose assembly connected to one of said first and second swivel fittings;

said antitorsion fitting comprising a pintle member hermetically fixed to the hose member, a nipple member fixed to the swivel fitting and a bearing and sealing arrangement between said pintle and nipple members, said pintle and nipple members defining aligned fluid flow passages therethrough having substantially the same flow areas, with said nipple member mounted on said pintle member for rotation relative thereto, said bearing and seal arrangement disposed between said pintle and nipple members for facilitating relative rotation between said nipple member and said pintle member while blocking fluid flow from said passages along the juncture of said nipple and pintle members, said nipple and pintle members rotating relative to each other to prevent torsional stress in said hose member when said distal end moves relative to said supply line.

2. The connector claimed in claim 1 wherein said pintle member comprises a cylindrical element defining an annular end face hermetically welded to one end of said hose.

3. The connector claimed in claim 1 further comprising a sheath formed from woven wire surrounding said hose member and coterminous therewith, and a weldment fixing the respective axial ends of said hose member and said sheath together.

4. The connector claimed in claim 1 further comprising a second antitorsion fitting hermetically fixed to the hose member at its end opposite to the first mentioned antitorsion fitting.

5. A connector for delivering combustion gas to a gas fired appliance from a stationary supply line, the appliance being movable toward and away from the supply line with the connector straightening, flexing and tending to twist between them as the appliance moves, said connector comprising:

a composite hose and first and second antitorsion fittings connected to respective opposite ends of the composite hose;

said composite hose comprising a flexible metal hose member, a sheath formed from woven wire surrounding said hose member and coterminous therewith, and a weldment fixing the respective axial ends of said hose member and said sheath together;

said antitorsion fittings each comprising a pintle member hermetically fixed to the hose, a nipple member connected in fluid communication with one of said supply line or appliance and a bearing and sealing arrangement between said pintle and nipple members, said pintle and nipple members defining flow passages therethrough for conducting gas to the appliance with said nipple member mounted on said pintle member for rotation relative thereto, said bearing and seal arrangement disposed between said pintle and nipple members for facilitating relative rotation between said nipple member and said pintle member and blocking the flow of gas from said passages along the juncture of said nipple and pintle members, said nipple and pintle members rotating relative to each other to prevent torsional stress in said hose member when said appliance moves relative to said supply line.

6. In a flexible connector for delivering fluid under pressure from a stationary supply line comprising:

a composite hose assembly comprising a flexible hose member and a sheath coextending with and surrounding said hose member; and, an antitorsion fitting secured to one end of said hose assembly comprising:

a tubular pintle member hermetically joined to an end of said hose assembly and projecting therefrom to form a cylindrical fluid flow path from the hose assembly, an annularly extending surface extending about the flow path at the projecting end thereof and an outer cylindrical mounting surface portion;

a tubular nipple member riding on said outer mounting surface portion for rotational movement about the pintle member, said nipple member comprising an enlarged section surrounding the pintle outer mounting surface and an externally threaded section projecting from said enlarged section beyond said annularly extending pintle member surface, said enlarged section comprising an internal cylindrical surface confronting said outer cylindrical mounting surface portion and an external surface defining tool engaging portions, said threaded section forming a cylindrical fluid flow path aligned with and having substantially the same diametrical extent as the pintle member flow path, said threaded section defining a surface confronting said annularly extending end surface; and, a bearing and sealing arrangement between the pintle and nipple members comprising first and second O-ring seals sealingly disposed in annular grooves formed in said outer cylindrical mounting surface at locations spaced apart in the direction of the flow path, said O-rings projecting from said grooves and resiliently engaging said internal cylindrical surface at axially spaced locations to seal the juncture between said outer mounting surface and said internal cylindrical surface against leakage of fluid therebetween while maintaining said nipple and pintle members free to rotate relative to each other, and a rigid locking element bridging the space between said outer cylindrical mounting surface and said internal cylindrical surface and substantially fixed against axial movement with respect to both to lock said pintle and nipple members together in their assembled condition while enabling relative rotation therebetween.

7. A connector for delivering combustion gas to a gas fired appliance from a stationary supply line, the appliance being movable toward and away from the supply line with the connector between them, the connector straightening, flexing and tending to twist between them as the appliance moves, said connector comprising:

- a first swivel fitting connected to the supply line and comprising a body and a swivel member connected together for movement relative to each other and conducting gas from the supply line;
- a second swivel fitting connected to the appliance and comprising a second body and a second swivel member connected together for movement relative to each other and conducting gas to the appliance; and,
- a hose assembly extending between said first and second swivel fittings, said hose assembly comprising;
  - a flexible metal hose member; and, an antitorsion fitting forming one end of said hose assembly connected to one of said first and second swivel fittings; said antitorsion fitting comprising a cylindrical pintle member defining an annular end face hermetically welded one end of said hose member, a nipple member fixed to the swivel fitting and a bearing and sealing arrangement between said pintle and nipple members, said pintle and nipple members defining flow passages therethrough for conducting gas to the appliance with said nipple member mounted on said pintle member for rotation relative thereto, said bearing and seal arrangement disposed between said pintle and nipple members for facilitating relative rotation between said nipple member and said pintle member and blocking the flow of gas from said passages along the juncture of said nipple and pintle members, said nipple and pintle members rotating relative to each other to prevent torsional stress in said hose member when said appliance moves relative to said supply line.

8. The connector claimed in claim 7 wherein said nipple member comprises a threaded end projecting into a threaded swivel member opening.

\* \* \* \* \*